US010534133B2

(12) United States Patent
McDonald et al.

(10) Patent No.: US 10,534,133 B2
(45) Date of Patent: Jan. 14, 2020

(54) METHODS AND DEVICES FOR CLEAVING OPTICAL FIBERS (71) Applicant: Corning Optical Communications LLC, Hickory, NC (US)

(72) Inventors: Alvin John McDonald, Rutherford College, NC (US); Jeremy Jason Schermerhorn, Lincolnton, NC (US); Hieu Vinh Tran, Charlotte, NC (US)

(73) Assignee: Corning Optical Communications LLC, Charlotte, NC (US)

( * ) Notice: Subject to any disclaimer, the term of this patent is extended or adjusted under 35 U.S.C. 154(b) by 211 days.

(21) Appl. No.: 15/804,676

(22) Filed: Nov. 6, 2017

(65) Prior Publication Data
US 2018/0059322 A1    Mar. 1, 2018

Related U.S. Application Data (62) Division of application No. 14/506,875, filed on Oct. 6, 2014, now Pat. No. 9,829,633.

(51) Int. Cl.
*G02B 6/25* (2006.01)
*G02B 6/38* (2006.01)

(52) U.S. Cl.
CPC .............. *G02B 6/25* (2013.01); *G02B 6/3822* (2013.01); *G02B 6/3846* (2013.01)

(58) Field of Classification Search
CPC ...... G02B 6/3822; G02B 6/25; G02B 6/3846; G02B 6/3833; G02B 6/3616; Y10T 225/321; Y10T 83/0333; Y10T 225/12; Y10T 225/325; Y10T 225/329; B26D 3/08; B26F 3/002; B23D 57/0023; B28D 5/045
See application file for complete search history.

(56) References Cited

U.S. PATENT DOCUMENTS

| 4,146,374 | A | * | 3/1979 | van Hoppe | ............... G02B 6/25 225/2 |
| 4,216,004 | A | * | 8/1980 | Brehm | ...................... G02B 6/25 225/2 |
| 4,245,537 | A | * | 1/1981 | Curtis | ..................... B26F 3/002 225/96 |
| 5,058,983 | A | | 10/1991 | Corke et al. | |

(Continued)

FOREIGN PATENT DOCUMENTS

| GB | 2179341 A | * | 3/1987 | ............... G02B 6/25 |
| WO | WO-9103750 A1 | * | 3/1991 | ............... G02B 6/25 |

OTHER PUBLICATIONS

English Translation of CN2015800619635 Search Report dated Feb. 22, 2019, 2 Pages; Chinese Patent Office.

*Primary Examiner* — Jonathan G Riley
(74) *Attorney, Agent, or Firm* — Adam R. Weeks (57) ABSTRACT

Methods for cleaving an optical fiber that extends from a ferrule are provided herein. The ferrule can be aligned on a first side of a scribe wire and an unconstrained end of the optical fiber on a second side of the scribe wire. Tension can be applied to the scribe wire with the optical fiber. Relative motion between the scribe wire and the optical fiber can be caused, while the tension is applied with the optical fiber. The scribe wire and the optical fiber can be separated. A fiber optic shard can be cleaved from the optical fiber. The fiber optic shard may include the unconstrained end of the optical fiber.

21 Claims, 9 Drawing Sheets

(56) References Cited

U.S. PATENT DOCUMENTS

| | | | | |
|---|---|---|---|---|
| 5,501,385 | A * | 3/1996 | Halpin | G02B 6/25 225/96 |
| 10,025,037 | B2 | 7/2018 | Morioka et al. | |
| 10,139,568 | B2 | 11/2018 | Yamaguchi et al. | |
| 2003/0140914 | A1 | 7/2003 | Lukschandel et al. | |
| 2005/0109177 | A1* | 5/2005 | Wiley | G02B 6/25 83/13 |
| 2010/0163009 | A1* | 7/2010 | Kawasaki | B23D 57/0023 125/16.01 |
| 2011/0188829 | A1* | 8/2011 | Raker | G02B 6/25 385/135 |
| 2012/0018482 | A1* | 1/2012 | Pepin | G02B 6/25 225/2 |
| 2012/0141082 | A1* | 6/2012 | Sawicki | G02B 6/25 385/134 |
| 2014/0041790 | A1* | 2/2014 | Isenhour | G02B 6/32 156/155 |
| 2014/0083273 | A1* | 3/2014 | Vallance | B26D 3/08 83/880 |
| 2017/0139138 | A1* | 5/2017 | Gregorski | G02B 6/25 |

\* cited by examiner

METHODS AND DEVICES FOR CLEAVING OPTICAL FIBERS

CROSS-REFERENCE TO RELATED APPLICATIONS

This application is a division of U.S. patent application Ser. No. 14/506,875, filed on Oct. 6, 2014, the entire disclosure of which is incorporated herein by reference.

BACKGROUND

Field

The present disclosure generally relates to methods and devices for cleaving optical fibers via a scribe wire.

Technical Background

During the manufacture of an optical cable, the optical cable may be produced with an excess fiber stub that protrudes beyond a desired length. For example, after an epoxy curing process is complete, the excess fiber stub may protrude past the ferrule end face on an optical fiber connector. As an intermediate step, such as, immediately prior to buffing and polishing the optical fiber of the optical cable, the optical fiber can be cleaved to remove the excess fiber stub.

Some manufacturing processes rely upon a manual process of scribing the optical fiber to remove the excess fiber stub. For example, an operator may hold the fiber optic connector. While holding the fiber optic connector, the operator may slide a scribing pencil tip across the optical fiber connector. The excess fiber stub beyond the scribe location can then be removed from the optical fiber connector in order to get a clean cut without shattering the fiber optic glass. However, the scribing pencil may have poor robustness and the variability of the manual process can be dependent upon the particular abilities of the operator.

Accordingly, alternative methods and devices for cleaving optical fibers are desired.

SUMMARY

Embodiments of the present disclosure relate to methods and devices for cleaving optical fibers via a scribe wire and, more specifically, to methods and devices for cleaving optical fibers via a tensioned scribe wire.

In one embodiment, a method for cleaving an optical fiber that extends from a ferrule may include aligning the ferrule on a first side of a scribe wire and an unconstrained end of the optical fiber on a second side of the scribe wire. Tension can be applied to the scribe wire with the optical fiber. Relative motion between the scribe wire and the optical fiber can be caused, while the tension is applied with the optical fiber. The scribe wire and the optical fiber can be separated. A fiber optic shard can be cleaved from the optical fiber. The fiber optic shard may include the unconstrained end of the optical fiber.

In another embodiment, a method for cleaving an optical fiber that extends from a ferrule may include aligning the ferrule on a first side of a scribe wire and an unconstrained end of the optical fiber on a second side of the scribe wire. Scribing tension can be applied to the scribe wire with the optical fiber. The scribe wire can be dragged across the optical fiber and along a separation path that is parallel to an axis of the optical fiber, after the scribing tension is applied to the scribe wire with the optical fiber. A fiber optic shard can be cleaved from a remainder of the optical fiber. The fiber optic shard may include the unconstrained end of the optical fiber.

In a further embodiment, a device for cleaving at least one optical fiber may include a guide body, a scribe wire, a transit member and a latching member. The scribe wire can be engaged with the guide body at first and second engagement locations of the scribe wire. A spanning section of the scribe wire can be disposed between the first and second engagement locations of the scribe wire and aligned with a scribe path. The transit member can move with respect to the scribe wire and along the scribe path. The transit member may include a port configured to accept a portion of a fiber optic connector having a ferrule and position an end face of the ferrule proximate to the scribe wire. The latching member can be coupled to the transit member and located adjacent to the port. The latching member can be configured to apply a force to the portion of the fiber optic connector received by the port as the transit member moves along the scribe path.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate embodiments, and together with the description serve to explain principles and operation of the various embodiments.

BRIEF DESCRIPTION OF THE DRAWINGS

The components of the following figures are illustrated to emphasize the general principles of the present disclosure and are not necessarily drawn to scale. The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Some aspects of the present disclosure are directed to methods for cleaving optical fibers and devices for cleaving optical fibers. Generally, the methods for cleaving optical fibers and devices for cleaving optical fibers relate to the use of a scribe wire to remove excess optical fiber from a fiber optic connector. Some embodiments can have particular utility for removing a fiber optic shard from an optical fiber at the end face of a ferrule.

Figure 1:
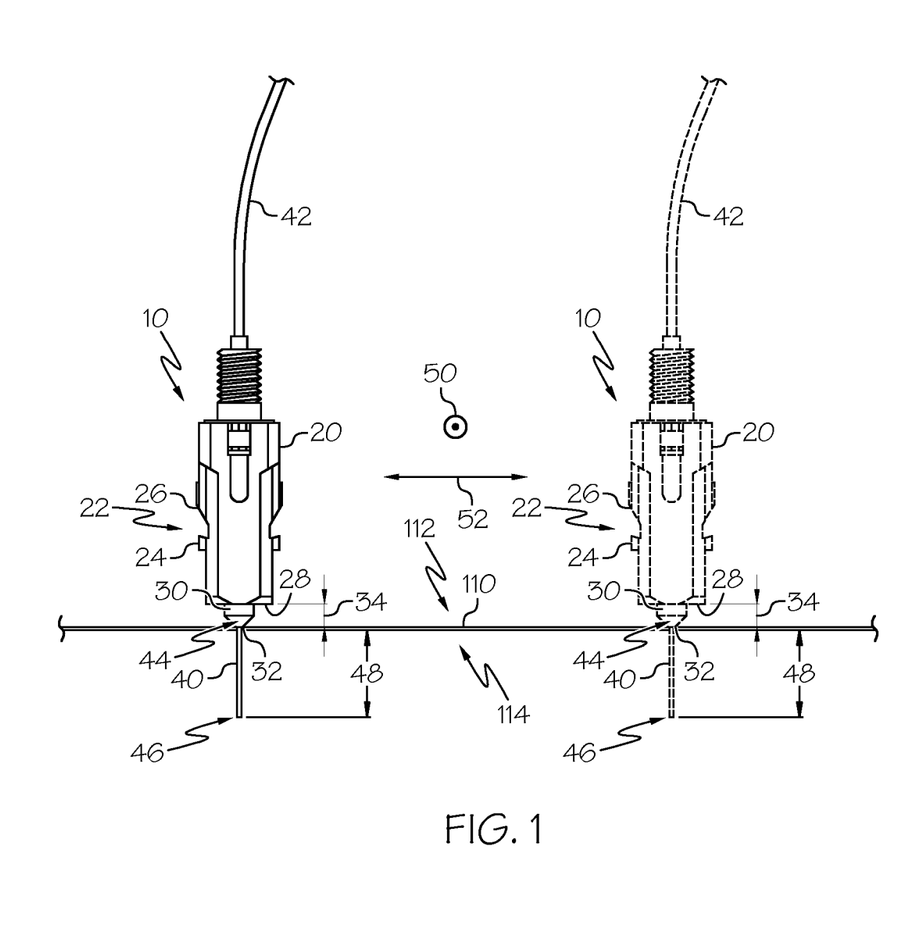
FIGS. 1-2 schematically depict a method for cleaving an optical fiber according to one or more embodiments described and illustrated herein.

Referring now to FIG. 1, an embodiment of a fiber optic connector 10 is schematically depicted. The fiber optic connector 10 can comprise a connector housing 20 such as, for example, a plug or a receptacle for mating with a correspondingly shaped connector (not depicted). In some embodiments, the connector housing 20 may include one or more engagement features 22 for resisting relative motion between the connector housing 20 and a mated connector. The one or more engagement features 22 can comprise a detent 24, sloped body 26, or any other body suitable for interlocking with another body. The connector housing 20 may be formed of plastic or other compliant material that is resistant to fatigue-related failure modes. It should be understood that embodiments are not limited to the engagement features 22 illustrated in the figures, as other means of engaging the connector housing 20 with a correspondingly shaped connector are also possible. For example, the connector housing 20 and engagement features 22 can be compliant with known connector types such as, but not limited to, SCUPC, SCAPC, LCUPC, LCAPC, or any other single or multiple fiber connector type.

The fiber optic connector 10 can comprise a ferrule 30 that extends from the connector housing 20. In the illustrated embodiment, the connector housing 20 defines a ferrule face 28 from which the ferrule 30 extends. Specifically, the ferrule 30 can extend from the ferrule face 28 of the connector housing 20 to an end face 32 of the ferrule 30. The end face 32 of the ferrule 30 can be offset from the ferrule face 28 of the connector housing 20 by a ferrule span 34. As non-limiting examples, the ferrule 30 may be fabricated from ULTEM™ sold by SABIC Innovative Plastics Holding BV of Riyadh, Saudi Arabia, or Zeonex® cyclic olefin polymer sold by Zeon Chemicals LP of Louisville, Ky., USA.

The fiber optic connector 10 can comprise an optical fiber 40 that is transmissive to optical signals, i.e., the optical fiber 40 can function as an optical waveguide or "light pipe." The optical fiber 40 can be formed from any material that is transmissive to optical signals such as, for example, glass, polymer, semiconductors, crystalline materials, or combinations thereof. Suitable glass materials for can comprise silica glass, fluorozirconate glass, fluoroaluminate glass, chalcogenide glass, or the like. The optical fiber 40 can be a Single-mode type, a Multi-mode type, a Clear-curve type, or can be configured for single-fiber applications.

Referring still to FIG. 1, the fiber optic connector 10 can be coupled to an optical cable 42. In some embodiments, the optical fiber 40 can be configured to transmit optical signals through the optical cable 42 and to transmit, receive, or both transmit and receive optical signals at the fiber optic connector 10. It is noted that, during manufacturing processes, the optical fiber 40 can protrude from the fiber optic connector 10. Specifically, the optical fiber 40 can comprise a constrained portion 44 that is constrained by the fiber optic connector 10. In some embodiments, the constrained portion 44 of the optical fiber 40 can be constrained by the ferrule 30 such that the constrained portion 44 of the optical fiber 40 is delineated by the end face 32 of the ferrule 30. For example, the constrained portion 44 of the optical fiber 40 can be surrounded by the ferrule 30 and can be attached to the ferrule 30 with a bonding agent (e.g., curable epoxy or the like) prior to being cleaved. The optical fiber 40 can comprise an unconstrained end 46 that is offset from the constrained portion 44 of the optical fiber and cantilevered from the ferrule 30.

For some applications, it may desirable for the optical fiber 40 to terminate at a location adjacent to the end face 32 of the ferrule 30. The optical fiber 40 can be cleaved at or near the end face 32 of the ferrule 30. Alternatively or additionally, surface treatments can be applied to the optical fiber 40 such that the optical fiber 40 achieves a desired polish or shape (flatness, roundness, etc.). Accordingly, after being cleaved and/or having the desired surface treatment applied, the optical fiber 40 can be flush with the end face 32 of the ferrule 30, recessed with respect to the end face 32 of the ferrule 30, or protrude from the end face 32 of the ferrule 30.

Figure 2:
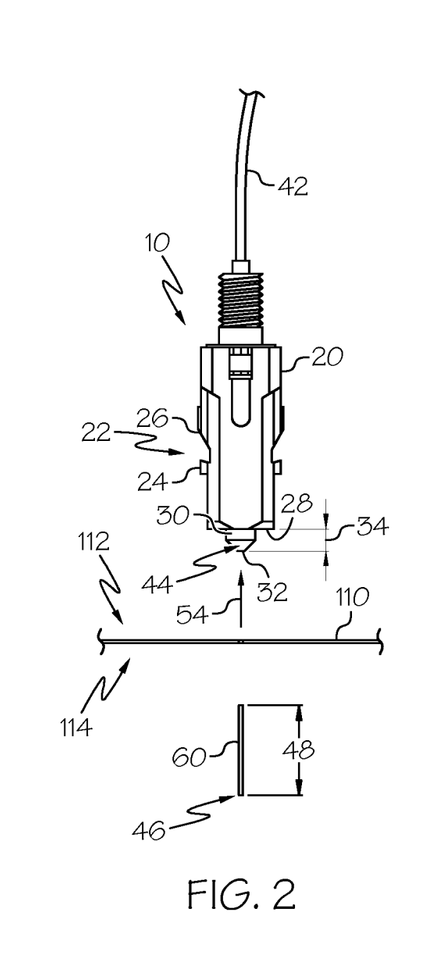

Referring collectively to FIGS. 1 and 2, an exemplary method for cleaving the optical fiber 40 is described. As is noted above, the optical fiber 40 can comprise an undesired portion of fiber that extends from the end face 32 of the ferrule 30. The undesired portion can be defined by a shard span 48 that extends between the constrained portion 44 of the optical fiber 40 to the unconstrained end 46 of the optical fiber 40. According to the embodiments described herein, the optical fiber 40 can be cleaved by a scribe wire 110.

The scribe wire 110 can be selected to perform the cleave with a desired amount of precision. Specifically, the scribe wire 110 can have a diameter from about 50 μm to about 800 μm in one embodiment, from about 100 μm to about 400 μm in another embodiment, or about 200 μm in a further embodiment. The scribe wire 110 can be formed from any durable material capable of cleaving the optical fiber 40. In some embodiments, the scribe wire can be formed from a wire having a durable coating such as, for example, a nickel-diamond coated wire or a diamond coated wire. Suitable examples of such wires are provided in U.S. Patent Application No. 2003/0140914 by Lukschandel et al.

Figure 3A:
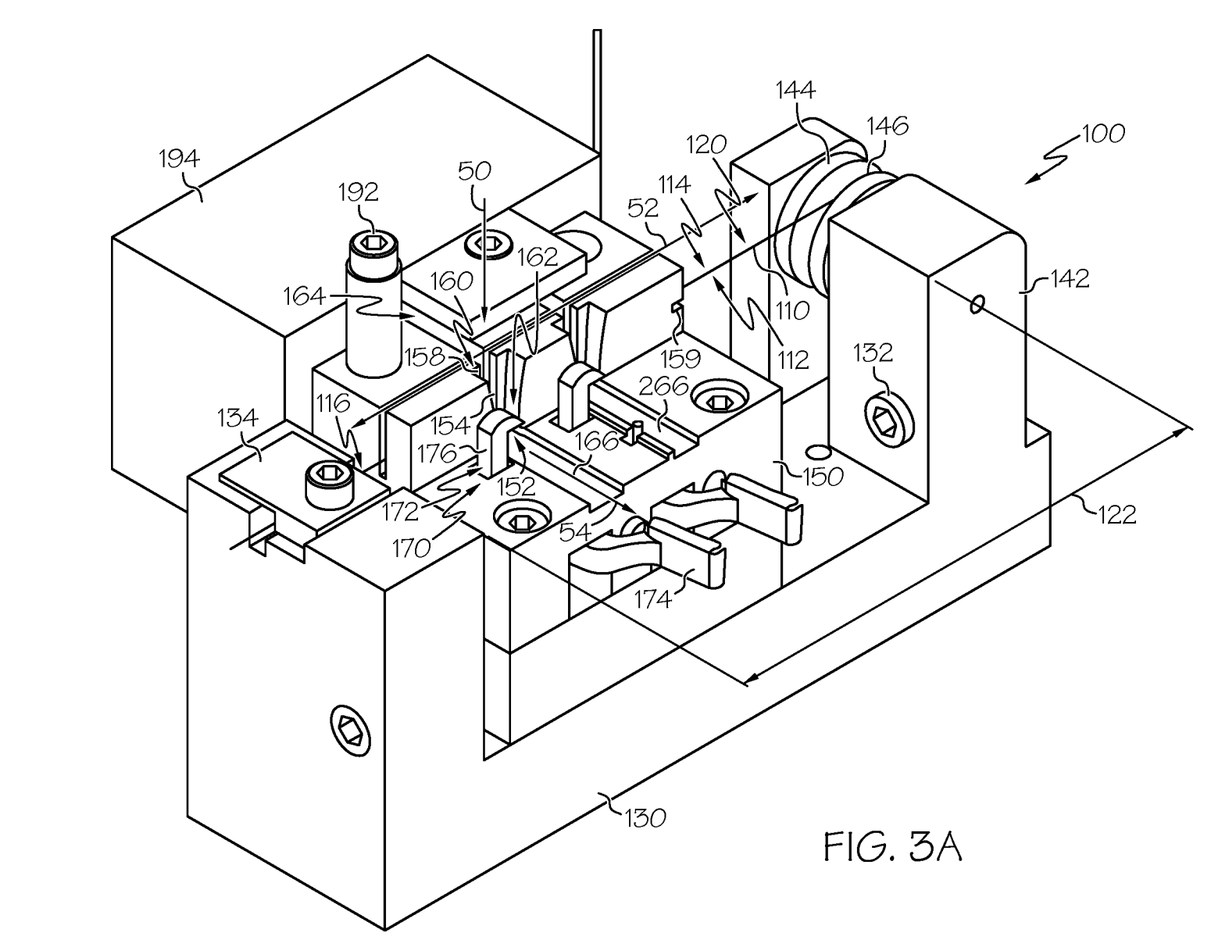
FIGS. 3A and 3B schematically depict an isometric view of a device according to one or more embodiments described and illustrated herein.

As is explained in greater detail below, a predetermined amount of tension can be applied to the scribe wire 110 prior to cleaving the optical fiber 40. For example, the scribe wire 110 can be loaded to the predetermined amount of tension such that the scribe wire 110 remains in a unloaded position 120 (FIG. 3) when undisturbed by external objects and forces. For example, the scribe wire 110 can be loaded to the predetermined amount of tension, and maintained in the unloaded position 120 by a fixture, tool, or the like.

The scribe wire 110 and the optical fiber 40 can be aligned with respect to one another to define the cleaving location along the shard span 48 of the optical fiber 40. For example, to perform a cleave proximate the ferrule 30, the scribe wire 110 can be aligned with the optical fiber 40 substantially along the ferrule face 28 of the connector housing 20. Alternatively, to provide for more protrusion, the scribe wire 110 can be aligned with the optical fiber 40 offset from the ferrule face 28 of the connector housing 20. Accordingly, the constrained portion 44 of the optical fiber 40 can be located on a first side 112 of the scribe wire 110 and the unconstrained end 46 of the optical fiber 40 can be offset from the scribe wire 110 on a second side 114 of the scribe wire 110.

The optical fiber 40 can be utilized to apply a scribing tension to the scribe wire 110. Accordingly, the amount of tension applied to the scribe wire 110 can be increased from the predetermined amount of tension to the scribing tension. In some embodiments, the optical fiber 40 can be urged along an insertion path 50 (direction into the page in FIG. 1) to apply the scribing tension to the scribe wire 110. After the scribing tension is applied to the scribe wire 110 with the optical fiber 40, relative motion can be generated between the scribe wire 110 and the optical fiber 40. A scribe path 52 can be defined by the orientation of the scribe wire 110 during the relative motion. Specifically, the relative motion and the scribing tension can cause material to be removed from the optical fiber 40 by the scribe wire 110 along the scribe path 52 to form a corresponding void 41 (FIG. 9) in the optical fiber 40 along the scribe path 52. Accordingly, the relative motion between the scribe wire 110 and the optical fiber 40 is generally aligned with the scribe path 52. It is noted that, while the scribe path 52 is depicted in FIG. 1 as being substantially orthogonal to the optical fiber 40, the orientation of the scribe wire 110 can be set with respect to the optical fiber 40 to define non-orthogonal scribe paths such as, for example, to achieve an angled face at the cleave location.

Referring still to FIGS. 1 and 2, upon removing material from the optical fiber 40 along the scribe path 52, a fiber optic shard 60 can be separated from the optical fiber 40. In some embodiments, the scribe wire 110 and the constrained portion 44 of the optical fiber 40 can be separated from one another along a separation path 54. For example, the constrained portion 44 of the optical fiber 40 can be urged away from the scribe wire 110. As the constrained portion 44 of the optical fiber 40 is urged away from the scribe wire 110, the void 41 (FIG. 9) formed in the optical fiber 40 along the scribe path 52 can serve as an initiation point for the cleave of the optical fiber 40. The forces interacting between the scribe wire 110 and the optical fiber 40 can cause a crack 42 (FIG. 9) to propagate through the optical fiber 40 in substantial alignment with the scribe path 52. Applicants have discovered that, when the scribe wire 110 and the optical fiber 40 have relative motion along scribe path 52 followed by relative motion along the separation path 54, the fiber optic shard 60 can be removed from the optical fiber 40 leaving a "clean" cleave at the optical fiber 40. Specifically, the fiber optic shard 60 can be removed from the optical fiber 40 without damaging the optical fiber 40. Indeed, the probability of shattering the optical fiber 40 has been decreased by the processes described herein as compared to other processes. Furthermore, such "clean" cleaves can be achieved without leaving excessive unwanted material upon the optical fiber 40. Indeed, in some embodiments, the optical fiber 40 can be at least partially polished by the interaction of the scribe wire 110 and the optical fiber 40.

According to the embodiments described herein, the scribe path 52 and the separation path 54 can be substantially orthogonal to one another. For example, the optical fiber 40 can be cleaved such that the optical fiber 40 is substantially parallel to the end face 32 of the ferrule 30 along the cleave, i.e., orthogonal to a normal vector to the end face 32 of the ferrule 30. Specifically, the scribe path 52 can be substantially parallel to the end face 32 of the ferrule 30. The separation path 54 can be substantially orthogonal to the scribe path 52 and the end face 32 of the ferrule 30, i.e., aligned along the axis of the optical fiber 40. Accordingly, a fiber optic shard 60 can be cleaved from the optical fiber 40. Specifically, the fiber optic shard 60 can be formed from the undesired portion of fiber that extends between the constrained portion 44 of the optical fiber 40 to the unconstrained end 46 of the optical fiber 40. Thus, the unconstrained end 46 of the optical fiber 40 can be cleaved from the optical fiber 40 by the removal of the fiber optic shard 60 from the optical fiber 40.

Figure 3B:
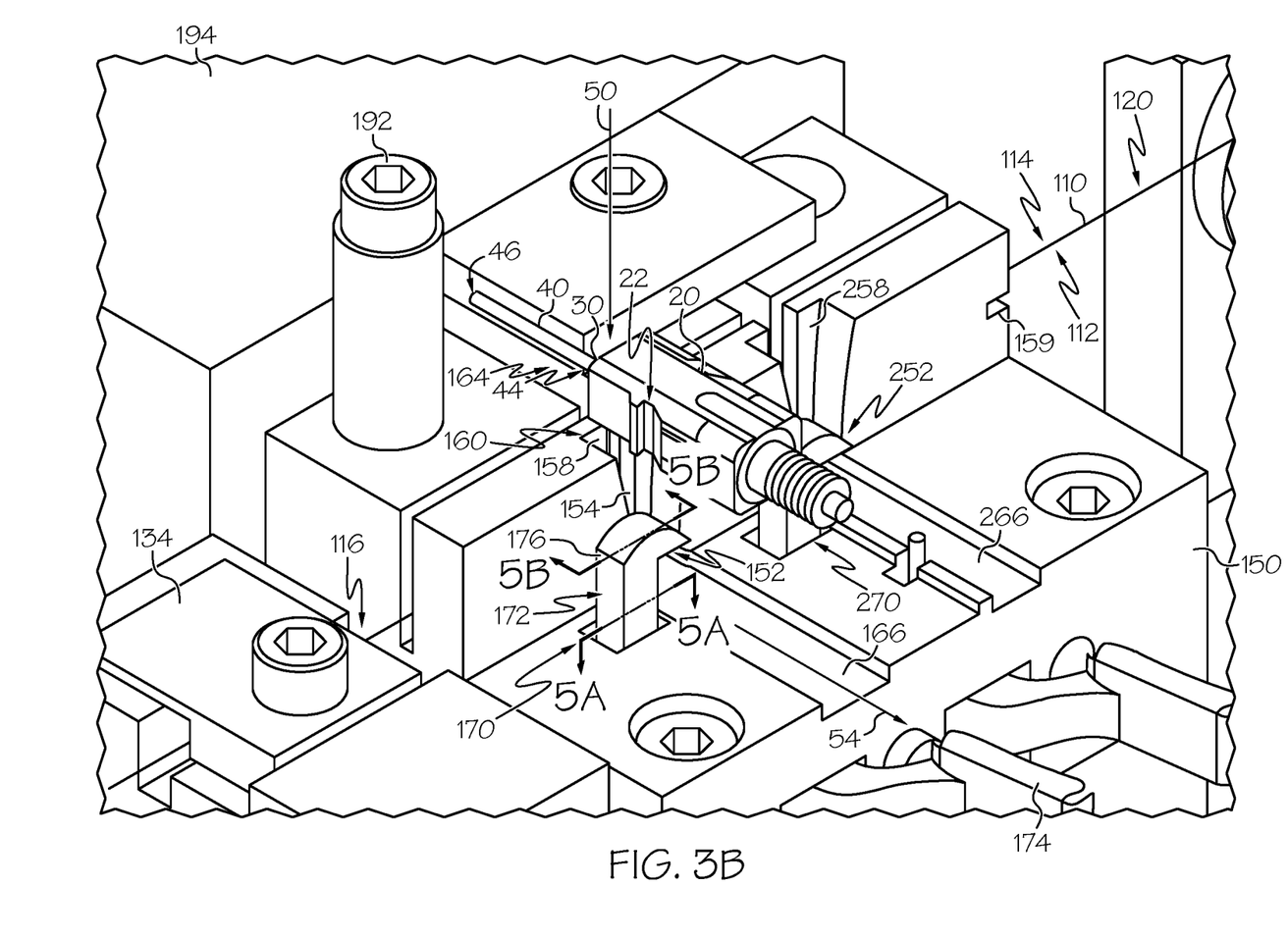
Figure 4:
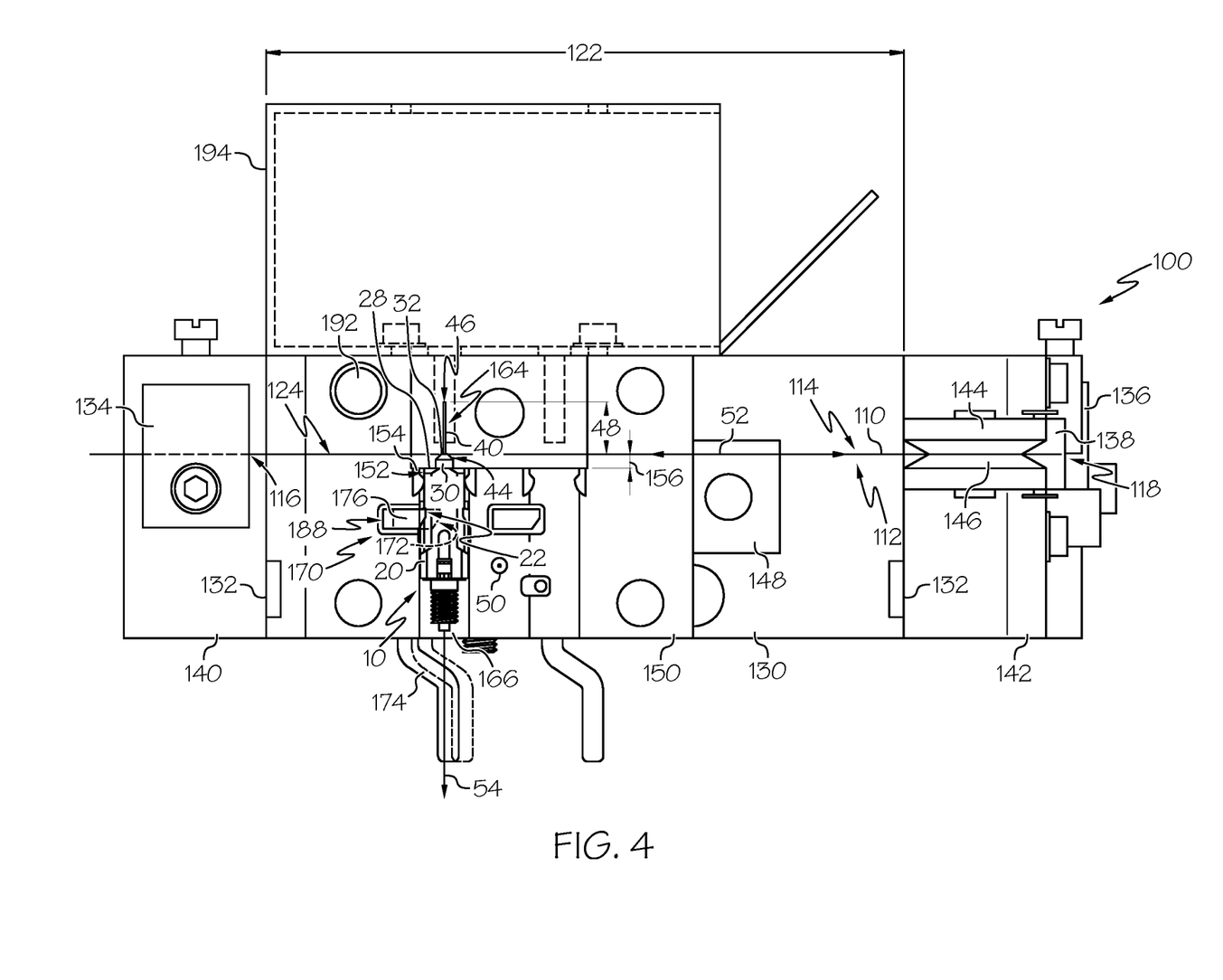
FIG. 4 schematically depicts a top view of the device of FIG. 3 according to one or more embodiments described and illustrated herein.

Referring collectively to FIGS. 3A, 3B and 4, the optical fiber 40 can be cleaved using a device 100. It is noted that, for clarity, the optical cable 42 (FIGS. 1 and 2) is not depicted in FIGS. 3B and 4. Generally, the device 100 comprises a guide body 130 that bounds the scribe path 52, the scribe wire 110, a transit member 150 that moves with respect to the scribe wire 110 and along the scribe path 52, and a latching member 170 that interacts with the fiber optic connector 10. It is noted that each of the aforementioned components of the device 100 can be eliminated without departing from the present disclosure. Indeed, in further embodiments, the scribe wire 110 can be provided on a hand held tool for cleaving the optical fiber 40, according to the methods described herein. However, for the sake of clarity, embodiments of the device 100 are described in further detail below.

The device 100 can comprise the guide body 130 for constraining respective motion between the optical fiber 40 and the scribe wire 110. In some embodiments, the guide body 130 can delineate the scribe path 52 between two hard stops 132. Each hard stop 132 can be a substantially rigid member that is configured to limit the motion of the transit member 150, i.e., motion of the transit member 150 along the scribe path 52 can be confined between the hard stops 132.

The device 100 can comprise the transit member 150 configured to align the optical fiber 40 and the scribe wire 110 during relative motion between the optical fiber 40 and the scribe wire 110. The transit member 150 can comprise a port 152 for accepting a connector housing 20 of a fiber optic connector 10. The port 152 can be configured to locate the end face 32 of the ferrule 30 and define the cleave of the optical fiber 40. Specifically, the port 152 can accept the connector housing 20 and align the end face 32 of the ferrule 30 such that a desired angular orientation of the optical fiber 40 and the scribe wire 110 is achieved. Additionally, the alignment can be set such that the desired amount of the optical fiber 40 is separated due to the cleave, i.e., the optical fiber 40 is cut to a desired length with respect to the end face 32 of the ferrule 30. In some embodiments, the port 152 can comprise a ferrule alignment surface 154 that is offset from a ferrule alignment distance 156 (FIG. 4) from the scribe wire 110. The ferrule alignment surface 154 can be configured to abut a corresponding surface of the connector housing 20 (e.g., the ferrule face 28; FIG. 1) that is a known distance from the end face 32 of the ferrule 30. Accordingly, the ferrule alignment distance 156 can be adjusted to compensate for the known distance to achieve the desired length. For example, the port 152 can be configured to position the end face 32 of the ferrule 30 proximate to the scribe wire 110, when a "close" cleave is desired at the end face 32 of the ferrule 30.

The transit member 150 can comprise a loading member 158 for facilitating the loading of the connector housing 20 into the port 152. Generally, the loading member 158 is configured to constrain the motion of the connector housing 20 as the connector housing 20 is moved along the insertion path 50. In some embodiments, the loading member 158 can be a body that extends vertically from the port 152 of the transit member 150. The loading member 158 can extend from a loading end 160 that is offset from the port 152 along the insertion path 50 to a port end 162 that is adjacent to the port 152. In some embodiments, the loading member 158 can be less constraining at the loading end 160 than at the port end 162. Accordingly, the connector housing 20 can be accepted by the loading member 158 and guided into the port 152.

The transit member 150 can comprise a fiber orifice 164 for providing access to the scribe wire 110 for the optical fiber 40. In some embodiments, the fiber orifice 164 can be formed through the transit member 150 such that the optical fiber 40 can access the scribe wire 110, while the connector housing 20 is received by the port 152. Alternatively or additionally, the fiber orifice 164 can extend along the loading member 158 such that the optical fiber 40 can extend beyond the plane of the scribe wire 110 as the connector housing 20 is guided by the loading member 158 into the port 152.

The transit member 150 can comprise a removal alignment member 166 for facilitating movement of the connector housing 20 from the port 152. Generally, the removal alignment member 166 is configured to constrain the motion of the connector housing 20 as the connector housing 20 is moved along the separation path 54. The removal alignment member 166 can be configured to maintain the orientation of the optical fiber 40 and the scribe wire 110 as the connector housing 20 is moved along the separation path 54. As is explained in greater detail below, the removal alignment member 166 can be configured to maintain tension applied to the scribe wire 110 by the optical fiber 40 as the connector housing 20 is moved along the separation path 54. In some embodiments, the removal alignment member 166 can be formed as a recessed passage within the transit member 150 that terminates at the port 152.

Figure 6:
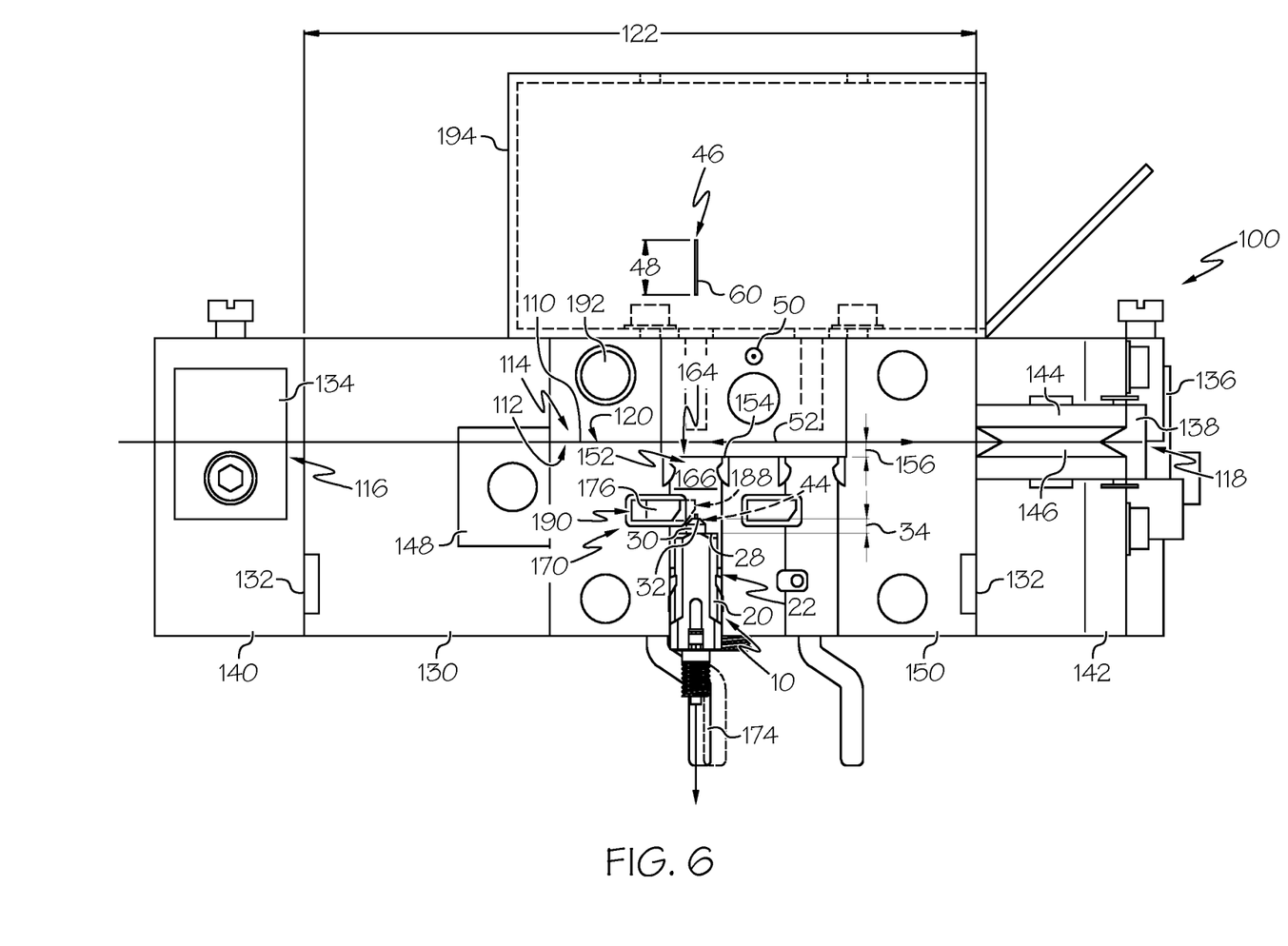
FIG. 6 schematically depicts a top view of the device of FIG. 3 according to one or more embodiments described and illustrated herein.

Referring collectively to FIGS. 4 and 6, the transit member 150 can be slidingly engaged with the guide body 130 and configured to slide along the scribe path 52. In some embodiments, the transit member 150 can be constrained by the guide body 130 such that the transit member 150 is configured to slide only along the scribe path 52. For example, the guide body 130 can comprise a path defining member 148 that is coupled to the guide body 130 between the hard stops 132 and aligned with the scribe path 52. The transit member 150 can interact with the path defining member 148 to travel along the scribe path 52. The path defining member 148 can be configured such that, when the transit member 150 travels along the scribe path 52, the transit member 150 can contact the hard stops 132. Accordingly, the extent of motion of the transit member 150 can be limited to the portion of the scribe path 52 located between the hard stops 132. It is noted that, while the path defining member 148 is depicted as a protruding rail, the path defining member 148 can be any device suitable for promoting linear motion of the transit member 150 with respect to the guide body 130.

Referring again to FIG. 3B, the transit member 150 can be configured to interlock with multiple connectors simultaneously. In the depicted embodiment, the transit member 150 can further comprise a second port 252, a second loading member 258, a second removal alignment member 266, and a second latching member 270. Each of the second port 252, the second loading member 258, the second removal alignment member 266, and the second latching member 270 can be formed and function the same as the port 152, the loading member 158, the removal alignment member 166, and the latching member 170 described herein. Alternatively or additionally, the port 152 and the second port 252 can be configured to interlock with different types of connectors.

Now referring collectively to FIGS. 3 and 4, the latching member 170 can be configured to apply force to the connector housing 20. In some embodiments, the latching member 170 can be biased with a bias force to an interference position. When the bias force is opposed, the latching member 170 can move from the interference position throughout a range of motion. In some embodiments, the latching member 170 can comprise an actuation member 174 for receiving an opposition force for moving the latching member 170 throughout the range of motion. Specifically, when the opposition force is applied to the actuation member 174, the actuation member 174 can be utilized to urge the latching member 170 to a desired position within the range of motion.

Figure 5A:
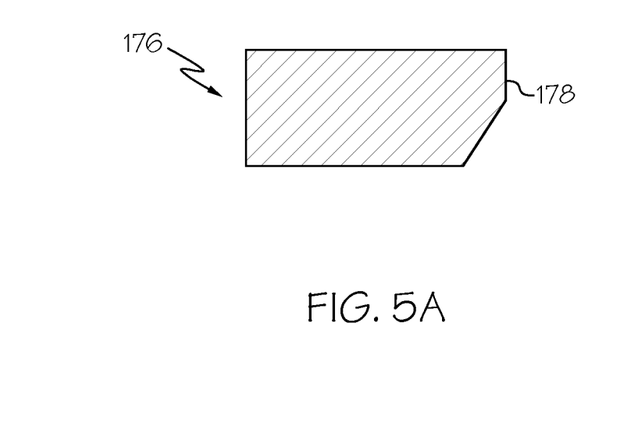
FIGS. 5A and 5B schematically depict a cross sectional view of an alignment member according to one or more embodiments described and illustrated herein.
Figure 5B:
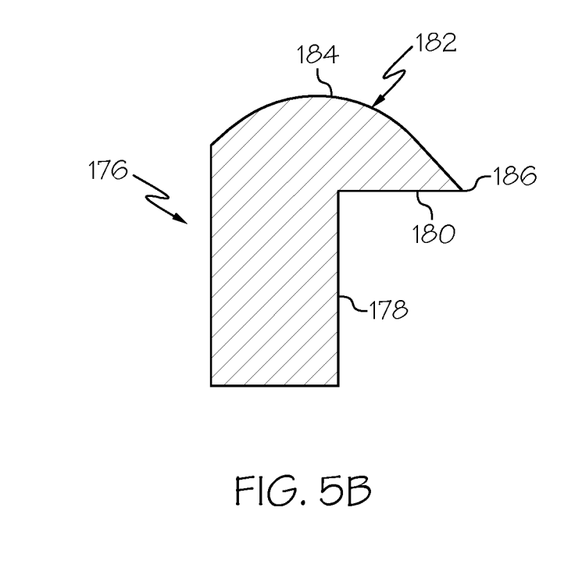

The latching member 170 can comprise an alignment member 176 for interacting with the connector housing 20. The alignment member 176 of the latching member 170 can be configured to constrain the motion of the connector housing 20 such that the optical fiber 40 and the scribe wire 110 are in alignment during relative motion along the scribe path 52. As shown in FIG. 5A, which depicts a cross sectional view of the alignment member 176 along line 5A in FIG. 3B, the alignment member 176 can comprise a profile surface 178 that interlocks with the engagement features 22 of the connector housing 20. For example, the profile surface 178 can be correspondingly shaped to match the detent 24 and the sloped body 26 of the connector housing 20. Accordingly, when the profile surface 178 is interlocked with the engagement features 22 of the connector housing 20, motion of the connector housing 20 along the separation path 54 can be opposed by the profile surface 178. As shown in FIG. 5B, which depicts a cross sectional view of the alignment member 176 along line 5B in FIG. 3B, the alignment member 176 can also comprise a tension surface 180 that constrains motion of the connector housing 20 along the insertion path 50. Specifically, the tension surface 180 can be configured to hold the connector housing 20 substantially fixed with respect to the insertion path 50. Accordingly, the tension surface 180 of the alignment member 176 can interact with the connector housing 20 and cause the optical fiber 40 to apply the scribing tension to the scribe wire 110.

The alignment member 176 can also comprise an actuation surface 182 that is configured to actuate the latching member 170 when the actuation surface 182 is contacted by the connector housing 20 urged along the insertion path 50. Accordingly, the actuation surface 182 can be configured to promote sliding between the connector housing 20 and the alignment member 176. The actuation surface 182 can also be configured to promote tangential motion of the alignment member 176 as a result of the sliding and motion along the insertion path 50. In some embodiments, the actuation surface 182 can located above the tension surface 180. The actuation surface 182 can be a gradually sloping surface that rounds downwards from summit 184 towards an intersection 186 with the tension surface 180.

Referring again to FIGS. 3 and 4, the scribe wire 110 can be fixed to the guide body 130 at a first engagement location 116 and a second engagement location 118. A spanning section 122 of the scribe wire 110 can be located between the first engagement location 116 and the second engagement location 118. The spanning section 122 of the scribe wire 110 can span the scribe path 52. In some embodiments, the spanning section 122 of the scribe wire 110 can span at least the portion of the scribe path 52 that is delimited by the hard stops 132 of the guide body. As is noted above, a predetermined amount of tension can be applied to the scribe wire 110. When the predetermined amount of tension is applied to the scribe wire 110, the scribe wire 110 can be provided at the unloaded position 120.

The predetermined amount of tension can be applied to the scribe wire 110 by stretching the scribe wire 110 along the scribe path 52. In some embodiments, the device 100 can comprise a first vertical member 140 and a second vertical member 142 for setting a height of the scribe wire 110 and maintaining the predetermined amount of tension. For example, a first wire clamping member 134 can be coupled to the first vertical member 140 and a second wire clamping member 136 can be coupled to the second vertical member 142. The first engagement location 116 of the scribe wire 110 can be fixed to the first vertical member 140 with the first wire clamping member 134. The second engagement location 118 of the scribe wire 110 can be fixed to the second vertical member 142 with a second wire clamping member 136. Accordingly, the spanning section 122 of the scribe wire 110 can be provided between the first vertical member 140 and the second vertical member 142 of the guide body 130 at the height.

In some embodiments, the guide body 130 can comprise a tension adjustment member 138 that can be extended and retracted with respect to the guide body 130. For example, the tension adjustment member 138 can be coupled to the second vertical member 142 of the guide body 130. The scribe wire 110 can be fixed to the guide body 130 such that scribe wire 110 is in contact with the tension adjustment member 138. Accordingly, the predetermined amount of tension can be applied to the scribe wire 110 by tension adjustment member 138. Specifically, tension on the scribe wire 110 can be increased by extending the tension adjustment member 138 with respect to the guide body 130 and decreased by retracting the tension adjustment member 138. The predetermined amount of tension can be determined by directly measuring the load upon the scribe wire 110 such as, for example, using a strain gauge or the like. Alternatively or additionally, the device 100 can be provided with a calibration indicator 159 that is indexed to a calibration height with respect to the unloaded position 120 of the scribe wire 110. The calibration height can be set such that when a calibration load is applied to the scribe wire 110, the scribe wire 110 is deflected from the unloaded position 120 into alignment with the calibration indicator 159. Suitable ranges for the predetermined amount of tension can be less than about 2 lbs (about 8.9 N) in one embodiment, between about 0.25 lbs (about 1.1 N) and about 1.5 lbs (about 6.7 N) in another embodiment, or between about 0.5 lbs (about 2.2 N) and about 1.0 lbs (about 4.5 N) in another embodiment.

As is noted above, the scribe wire 110 can be aligned to the scribe path 52. The device 100 can comprise a wire alignment member 144 for aligning the scribe wire 110 to the scribe path 52. In some embodiments, the wire alignment member 144 can be a substantially cylindrical body with alignment groove 146 formed through the outer diameter of the substantially cylindrical body. The alignment groove 146 can form a relatively small outer diameter for receiving the scribe wire 110. The wire alignment member 144 can be coupled to the second vertical member 142 of the guide body 130 and oriented such that the alignment groove 146 is aligned with the scribe path 52. Accordingly, as the scribe wire 110 moves, the wire alignment member 144 can accommodate such movement while maintaining the alignment between the scribe wire 110 and the scribe path 52.

Referring again to FIG. 3, an exemplary process for cleaving the optical fiber 40 with the device 100 is described. The alignment member 176 of the latching member 170 can be located adjacent to the port 152 of the transit member 150. The alignment member 176 can be biased to the interference position 172 such that at least a portion of the alignment member 176 is located directly above the removal alignment member 166. The fiber optic connector 10 can be urged along the insertion path 50. The connector housing 20 can interact with the loading member 158. Accordingly, the optical fiber 40 can be aligned with the scribe wire 110 and positioned within the fiber orifice 164.

As the fiber optic connector 10 traverses the loading member 158, the connector housing 20 can be urged into contact with the actuation surface 182 of the alignment member 176. The connector housing 20 can be urged further along the insertion path to cause the alignment member 176 to move tangentially as the connector housing 20 slides along the actuation surface 182. After the alignment member 176 is moved aside, the connector housing 20 can be maintained within the loading member 158 and urged further along the insertion path 50 towards the port 152.

Figure 7:
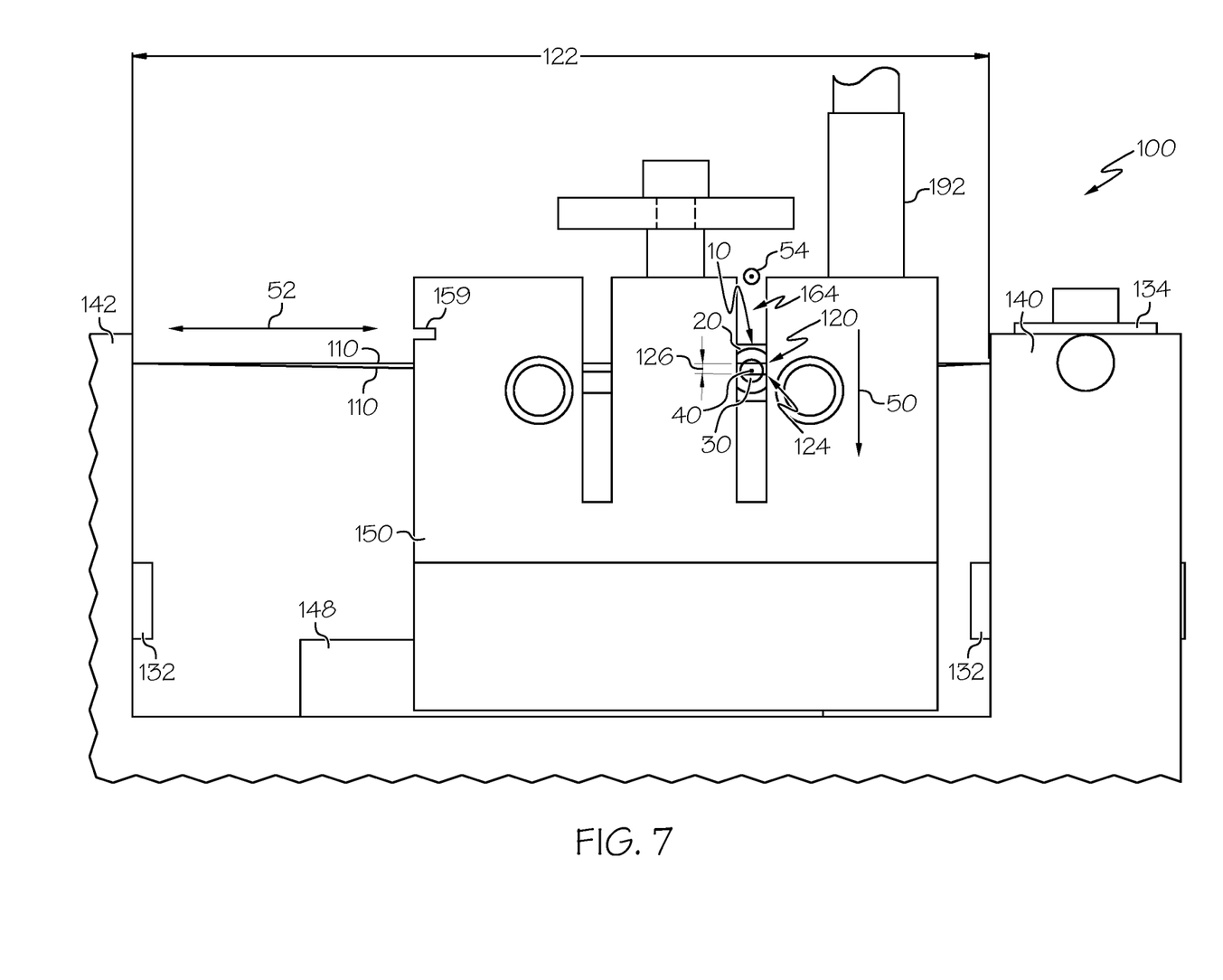
FIG. 7 schematically depicts a rear view of the device of FIG. 3 according to one or more embodiments described and illustrated herein.
Figure 8A:
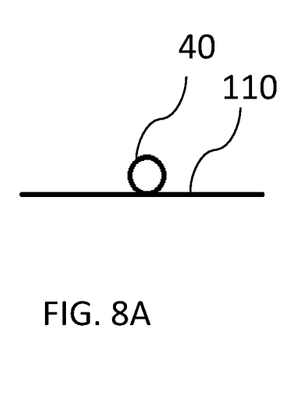
FIG. 8A depicts an optical fiber in contact with a scribe wire according to one or more embodiments described and illustrated herein.
Figure 8B:
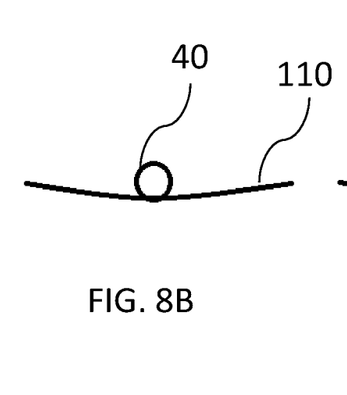
FIG. 8B depicts a deflecting a scribe wire with an optical fiber according to one or more embodiments described and illustrated herein.
Figure 8C:
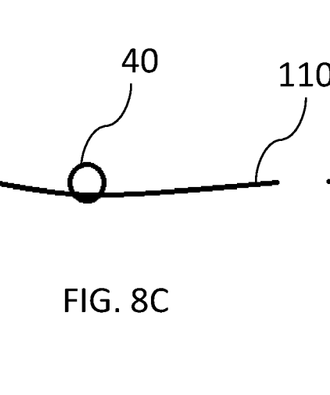
FIG. 8C depicts moving an optical fiber along the length of the scribe wire according to one or more embodiments described and illustrated herein.
Figure 8D:
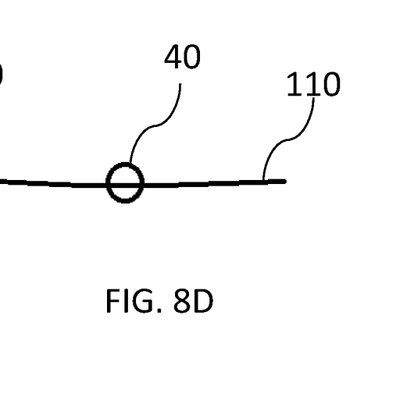
FIG. 8D depicts a scribe wire relaxing into the void created in an optical fiber according to one or more embodiments described and illustrated herein.

Referring collectively to FIGS. 4 and 7, the connector housing 20 can be received within the port 152. Upon the connector housing 20 being received by the port 152, the bias force applied to the alignment member 176 can cause the alignment member 176 to move into a mated position 188. When in the mated position 188, the alignment member 176 can interlock with the connector housing 20 to align the optical fiber 40 and the scribe wire 110. Accordingly, the connector housing can be held in contact with the ferrule alignment surface 154 of the port 152 to achieve the desired alignment. Alternatively or additionally, when in the mated position 188, the alignment member 176 can apply the scribing tension to the scribe wire 110. Specifically, the bias force can be utilized to apply a force to the connector housing and, thus, the optical fiber 40. Accordingly, the optical fiber 40 can apply the scribing tension to the scribe wire 110.

Generally, the scribing tension increases the amount of tension on the scribe wire 110 from the predetermined amount of tension. When the tension is increased, the scribe wire 110 can be deflected from the unloaded position 120 to a loaded position 124. The distance 126 of deflection can be controlled to control the scribing tension. The distance 126 of deflection measured with respect to the central axis of the optical fiber 40 can be between about 50 µm to about 8,000 µm in one embodiment, between about 250 µm to about 1,600 µm in another embodiment, or between about 500 µm and about 800 µm in a further embodiment.

Figure 9:
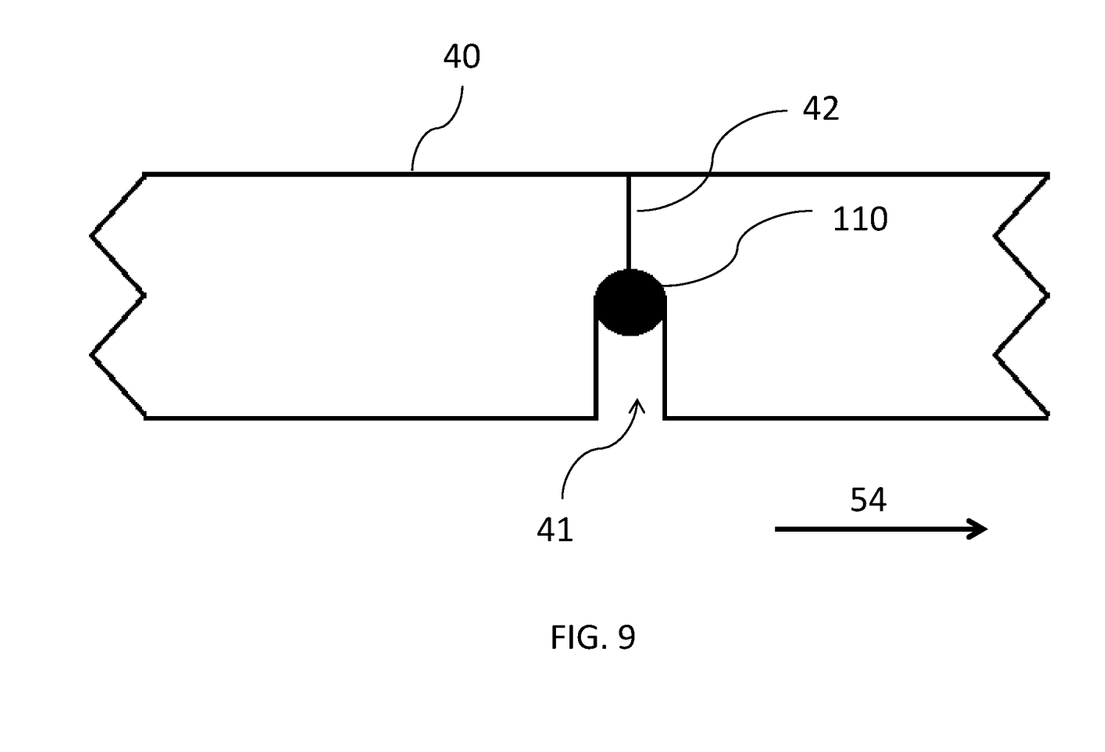
FIG. 9 depicts an axial cross-section view an optical fiber having a void created by the scribe wire and a crack propagated through the optical fiber in substantial alignment with the scribe path according to one or more embodiments described and illustrated herein.

Referring collectively to FIGS. 4 and 6, after the scribing tension is applied to the scribe wire 110 with the optical fiber 40, the transit member 150 can be urged along the scribe path 52 to generate relative motion between the scribe wire 110 with the optical fiber 40. For example, the transit member 150 can be coupled to a transit actuation member 192 that is configured to receive manual input to move the transit member 150. Alternatively or additionally, the transit member can be moved automatically such as, for example, via a servo-mechanism or the like. Accordingly, the scribe wire 110 can remove material from the underside of the optical fiber 40. In some embodiments, the transit member 150 can travel from the hard stop 132 at the first vertical member 140 (FIG. 4) to the hard stop 132 at the second vertical member 142 (FIG. 6). Accordingly, the scribe wire 110 and the optical fiber 40 can move a cut distance with respect to one another. The cut distance can be between about 0.25 inches and about 4.4 inches in one embodiment, between about 0.5 inches and about 2.2 inches in another embodiment, or between about 0.85 inches and about 1.35 inches in a further embodiment. It is noted that, while the motion of transit member 150 is described herein as traveling in a particular direction, the direction can be reversed or can be oscillated (combination of forward and reverse motion) provided that the scribe wire 110 and the optical fiber 40 move the cut distance with respect to one another. After the relative motion of between the scribe wire 110 and the optical fiber 40 along the scribe path 52, material can be removed from the optical fiber 40 to form a corresponding void 41 (FIG. 9). The scribe wire 110 (FIG. 8) can relax into the void 41 (FIG. 9) such that the tension applied to the scribe wire 110 is decreased to a relaxed tension. Referring to FIG. 8A through 8D, an example sequence of the relative motion between the scribe wire 110 and the optical fiber 40 along the scribe path 52 where the scribe wire 110 relaxes into the void 41 (FIG. 9) such that the tension applied to the scribe wire 110 is decreased to a relaxed tension is illustrated. Specifically, the relaxed tension applied to the scribe wire 110 can be greater than the predetermined amount of tension and less than the scribing tension.

Once the motion along the scribe path 52 is complete, the alignment member 176 of the latching member 170 can be moved to an open position 190. Once in the alignment member 176 is moved the open position 190, the removal alignment member 166 can be cleared to allow the connector housing 20 to move along the separation path 54. Specifically, when the alignment member 176 is in the open position 190, the connector housing 20 can be unlocked from the latching member 170. Accordingly, the connector housing 20 can be removed from the port 152 along the separation path 54.

As the connector housing 20 is urged along the separation path 54, the relaxed amount of tension can be applied to the scribe wire 110 by the optical fiber 40. For example, the connector housing 20 can be urged into contact with the removal alignment member 166 as the connector housing 20 is urged along the separation path 54. The tension of the scribe wire 110 and the motion of the optical fiber 40 along the separation path 54 cooperate to cause the initial void 41 (FIG. 9) to grow to provide a complete cleave through the optical fiber 40 and separate the fiber optic shard 60. Accordingly, motion of the connector housing 20 along the separation path 54 can correspond to dragging of the scribe wire 110 parallel to the axis of the optical fiber 40.

In some embodiments, the transit member 150 can be coupled to a shard container 194 that is configured to receive the fiber optic shard 60 generated by the cleave. Accordingly, the fiber optic shard 60 can automatically be collected with the shard container 194 upon removal. Moreover, the shard container 194 can be configured to overlap with the port 152 to reduce the probability of uncollected shards being ejected from the device 100.

It should now be understood that embodiments described herein are directed to apparatuses and methods for cleaving an optical fiber. Such embodiments have demonstrated improvements in durability, consumable cost, and manufacturing yield over a manual scribing pen process. Specifically, embodiments of the methods and devices for cleaving optical fibers using the scribe wire performed more than six times the number of cleaves of optical fibers before scribe wire failure compared to failure of the scribing pen in the manual scribing pen process. Embodiments of the methods and devices for cleaving optical fibers demonstrated a cost savings of about 94% compared to the manual scribing pen process. Embodiments of the methods and devices for cleaving optical fibers produced stub lengths having a standard deviation of about 50% of the standard deviation of the manual scribing pen process. Accordingly, the embodiments described herein have demonstrated a decrease in the variation of stub length among multiple operators. Additionally, the embodiments described herein have demonstrated a cycle time decrease from between about 14 seconds to about 18 seconds, for the manual scribing pen process, to between about 7 seconds to about 9 seconds.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

It is noted that terms like "generally," when utilized herein, are not intended to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the terms "substantially" and "about" are utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. Every numerical range given throughout this specification will include every narrower numerical range that falls within such broader numerical range, as if such narrower numerical range were all expressly written herein.

The invention claimed is:

1. A device for cleaving at least one optical fiber, the device comprising:
   a guide body comprising a first vertical member and a second vertical member for setting a scribe wire height;
   a scribe wire provided between the first vertical member and the second vertical member of the guide body at the scribe wire height and comprising a spanning section provided between the first vertical member and the second vertical member of the guide body;
   a transit member slidingly engaged with the guide body such that the transit member can move with respect to the scribe wire and along a scribe path; and a latching member coupled to the transit member, wherein:
   the spanning section of the scribe wire is aligned with the scribe path,
   the transit member comprises a port configured to accept a portion of a fiber optic connector having a ferrule,
   the port of the transit member is configured to position an end face of the ferrule proximate to the scribe wire, and
   the latching member is located adjacent to the port of the transit member, and is configured to apply a force to the portion of the fiber optic connector accepted by the port as the transit member moves along the scribe path.

2. The device of claim 1, further comprising:
a tension adjustment member coupled to the guide body and in contact with the scribe wire, wherein the tension adjustment member extends and retracts to adjust a tension applied to the scribe wire.

3. The device of claim 1, further comprising:
a removal alignment member that extends from the port along a separation direction that is orthogonal the scribe path, wherein the latching member comprises an alignment member that is biased to an interference position, and wherein, when the alignment member is in the interference position, at least a portion of the alignment member is located directly above the removal alignment member.

4. The device of claim 1, wherein the scribe wire is stretched to a predetermined amount of tension that is less than about 2 lbs.

5. The device of claim 1, wherein the transit member comprises a second port configured to accept a second fiber optic connector and position the second fiber optic connector with respect to the scribe wire.

6. The device of claim 1, further comprising:
an actuation member coupled to the latching member wherein the actuation member urges the latching member to a desired position throughout a range of motion.

7. The device of claim 1, further comprising:
a wire alignment member coupled to the first or second vertical member of the guide body and configured to align the scribe wire to the scribe path.

8. The device of claim 7, wherein the wire alignment member comprises a cylindrical body with an alignment groove formed through an outer diameter of the cylindrical body wherein the alignment groove forms a second diameter smaller than the outer diameter of the cylindrical body for receiving the scribe wire.

9. The device of claim 1, further comprising:
a shard container configured to receive a fiber optic shard.

10. The device of claim 1, wherein the fiber optic connector comprises an optical fiber extending from the ferrule such that when the fiber optic connector is received in the port, the ferrule is on a first side of the scribe wire and an unconstrained end of the optical fiber is on a second side of the scribe wire, and a tension is applied to the scribe wire by the optical fiber.

11. A device for cleaving at least one optical fiber, the device comprising:
a guide body comprising a first vertical member and second vertical member for setting a scribe wire height;
a scribe wire provided between the first vertical member and the second vertical member of the guide body at the scribe wire height and comprising a spanning section provided between the first vertical member and the second vertical member of the guide body; and
a transit member slidingly engaged with the guide body such that the transit member can move with respect to the scribe wire and along a scribe path, wherein:
   the spanning section of the scribe wire is aligned with the scribe path,
   the transit member comprises a port configured to accept a portion of a fiber optic connector comprising an optical fiber extending from a ferrule such that when the fiber optic connector is accepted in the port of the transit member, the ferrule is on a first side of the scribe wire and an unconstrained end of the optical fiber is on a second side of the scribe wire, and a tension is applied to the scribe wire by the optical fiber, and
   the port of the transit member is configured to interlock with the fiber optic connector accepted by the port as the transit member moves along the scribe path.

12. The device of claim 11, further comprising:
a tension adjustment member coupled to the guide body and in contact with the scribe wire, wherein the tension adjustment member extends and retracts to adjust the tension applied to the scribe wire.

13. The device of claim 11, wherein the scribe wire is stretched to a predetermined amount of tension that is less than about 2 lbs.

14. The device of claim 11, wherein the transit member comprises a second port configured to accept a second fiber optic connector and position the second fiber optic connector with respect to the scribe wire.

15. The device of claim 11, further comprising:
a latching member coupled to the transit member, wherein the latching member is located adjacent the port of the transit member and is configured to apply a force to the portion of the fiber optic connector accepted by the port as the transit member moves along the scribe path thereby causing a void in the optical fiber when the optical fiber moves along the scribe wire such that when the optical fiber is urged away from the scribe wire along a separation path generally orthogonal to the scribe path the void grows or a crack propagates from the void, to provide a complete cleave through the optical fiber, whereby a fiber optic shard is cleaved from the optical fiber.

16. The device of claim 15, further comprising:
an actuation member coupled to the latching member wherein the actuation member urges the latching member to a desired position throughout a range of motion.

17. The device of claim 15, further comprising:
a removal alignment member that extends from the port along a separation direction that is orthogonal the scribe path, wherein the latching member comprises an alignment member that is biased to an interference position, and wherein, when the alignment member is in the interference position, at least a portion of the alignment member is located directly above the removal alignment member.

18. The device of claim 11, further comprising:
a wire alignment member coupled to the first or second vertical member of the guide body and configured to align the scribe wire to the scribe path.

19. The device of claim 18, wherein the wire alignment member comprises a cylindrical body with an alignment groove formed through an outer diameter of the cylindrical body wherein the alignment groove forms a second diameter smaller than the outer diameter of the cylindrical body for receiving the scribe wire.

20. A device for cleaving at least one optical fiber, the device comprising:
- a guide body comprising a first hard stop and a second hard stop, wherein the guide body delineates at least a portion of a scribe path between the first hard stop and the second hard stop;
- a scribe wire fixed to the guide body at a first engagement location and a second engagement location, the scribe wire comprising a spanning section that spans the at least a portion of the scribe path that is delimited by the first hard stop and the second hard stop of the guide body; and
- a transit member slidingly engaged with the guide body such that the transit member can move with respect to the scribe wire and along the scribe path, wherein:
    - the first hard stop and the second hard stop limit motion of the transit member along the scribe path,
    - the transit member comprises a port configured to accept a portion of a fiber optic connector comprising an optical fiber extending from a ferrule such that when the fiber optic connector is accepted in the port of the transit member, the ferrule is on a first side of the scribe wire and an unconstrained end of the optical fiber is on a second side of the scribe wire, and a tension is applied to the scribe wire by the optical fiber, and
    - the port of the transit member is configured to interlock with the fiber optic connector accepted by the port as the transit member moves along the scribe path.

21. A method for cleaving at least one optical fiber using a cleaving device, wherein
the cleaving device comprises a guide body comprising a first vertical member and a second vertical member for setting a scribe wire height,
a scribe wire provided between the first vertical member and the second vertical member of the guide body at the scribe wire height and comprising a spanning section provided between the first vertical member and the second vertical member of the guide body and the spanning section of the scribe wire is aligned with a scribe path,
a transit member comprising a port configured to accept a portion of a fiber optic connector comprising an optical fiber extending from a ferrule and the transit member is slidingly engaged with the guide body such that the transit member moves with respect to the scribe wire and along the scribe path, and
a latching member coupled to the transit member, is located adjacent the port of the transit member, and is configured to apply a force to the portion of the fiber optic connector received by the port as the transit member moves along the scribe path, and
the method comprises:
  inserting the portion of the fiber optic connector into the port of the transit member, wherein the latching member constrains the fiber optic connector to the transit member such that the ferrule is on a first side of the scribe wire and an unconstrained end of the optical fiber is on a second side of the scribe wire;
  applying a predetermined amount of tension to the scribe wire with the optical fiber;
  creating a void in the optical fiber by moving the transit member along the scribe path;
  actuating the latching member to an open position to release the fiber optic connector from the transit member; and
  extracting the fiber optic connector from the port of the transit member along a separation path generally orthogonal to the scribe path while maintaining tension applied to the scribe wire with the optical fiber thereby causing the void to grow, or a crack to propagate from the void, to provide a complete cleave through the optical fiber and a fiber optic shard comprising the unconstrained end of the optical fiber to be cleaved from the optical fiber.

* * * * *